United States Patent [19]

Teramachi

[11] Patent Number: 4,844,624
[45] Date of Patent: Jul. 4, 1989

[54] BEARING FOR BOTH LINEAR AND CURVILINEAR MOTIONS

[76] Inventor: Hiroshi Teramachi, 34-8, Higashitamagawa 2-chome, Setagaya-ku, Tokyo, Japan

[21] Appl. No.: 196,580

[22] Filed: May 20, 1988

[30] Foreign Application Priority Data

May 25, 1987 [JP] Japan ................................ 62-125806

[51] Int. Cl.$^4$ ............................................. F16C 29/06
[52] U.S. Cl. ......................................... 384/45; 384/43
[58] Field of Search .......................... 384/43, 45, 44; 464/168

[56] References Cited

U.S. PATENT DOCUMENTS 4,557,532  12/1985  Teramachi ........................... 384/45

FOREIGN PATENT DOCUMENTS 62-14132  1/1987  Japan .
62-101914  5/1987  Japan .

Primary Examiner—Lenard A. Footland
Attorney, Agent, or Firm—Armstrong, Nikaido, Marmelstein, Kubovcik & Murray

[57] ABSTRACT

The present invention relates to a bearing for both linear and curvilinear motions which has a track rail, a bearing body provided with an endless track and a multiplicity of balls which recirculate through the endless track provided in the bearing body, wherein the endless track is defined by a loaded ball rolling surface which is provided with a linear loaded domain and a curvilinear loaded domain having a predetermined curvature, so that, in a linear area of the track surface of the track rail, a load is born by balls rolling on the linear loaded domain, whereas, in a curvilinear area of the track surface of the track rail, a load is born by balls rolling on the curvilinear loaded domain. Thus, it is possible to perform both linear and curvilinear guide operations with a single bearing.

9 Claims, 22 Drawing Sheets

BEARING FOR BOTH LINEAR AND CURVILINEAR MOTIONS

FIELD OF THE INVENTION AND RELATED ART STATEMENT

The present invention relates to a bearing for both linear and curvilinear motions which is capable of linearly and/or curvilinearly guiding an object which needs to be moved from a position as a reference position to another position as a target position in a slide part of any of various machine tools, industrial robots or parts conveyor systems.

There have heretofore been proposed and put into practical use a great variety of linear bearings which are designed to guide linearly an object from a reference position to a target position. In one type of the conventional linear bearings, a bearing body which slides along a track rail is defined by a slide base which has a horizontal portion and sleeve portions extending downward from the left and right sides, respectively, of the horizontal portion so as to have a substantially U-shaped cross-section with a recess defined in the lower side thereof and which further has one loaded ball rolling surface formed on the inner side of each of the sleeve portions, thus enabling a reduction in the height of the bearing. In another type of the conventional linear bearings, a bearing body which slides along a track rail is defined by a slide base which has a horizontal portion and sleeve portions extending downward from the left and right sides, respectively, of the horizontal portion so as to have a substantially U-shaped cross-section with a recess defined in the lower side thereof and which further has a pair of adjacent loaded ball rolling surfaces formed on the inner side of each of the sleeve portions, thereby making it possible to uniformly bear loads applied in four directions, i.e., radially outward and inward as well as horizontally leftward and rightward, or to bear chiefly loads applied in the radial direction. There has also been proposed a separate type linear bearing wherein a slide base for constituting a bearing body comprises two slide base halves each having a substantially rectangular cross-section and provided with a pair of adjacent loaded ball rolling surfaces and a track rail also comprises track base halves corresponding to the slide base halves, thereby enabling a reduction in the height of the bearing and, at the same time, making it possible to uniformly bear loads applied in the four directions.

In contrast, no substantial consideration has heretofore been given to means for curvilinearly guiding an object from a reference position to a target position. For example, when there is a need for a curvilinear guide from the viewpoint of the relationship with a peripheral machine or tool in a parts conveyor system or the like or of the system design, it is conventional practice to use a curvilinear guide apparatus such as that shown in FIG. 38. More specifically, a track rail 101 is formed so as to have either an arcing or circular cross-section, and ridges 102 having a substantially V-shaped cross-section are formed on both shoulder portions, respectively, of the track rail 101. On the other hand, a slide base 103 is defined by a rectangular table 104 which has two cam followers 105a disposed at the outer peripheral side of the track rail 101 and two cam followers 105b disposed at the inner peripheral side of the track rail 101, these four cam followers 105a and 105b being respectively secured to the four corners of the table 104. Each of the cam followers 105a and 105b includes an outer wheel 106 which has a substantially V-shaped rolling contact groove 107 formed circumferentially in the outer periphery thereof. With the grooves 107 engaged with the ridges 102 of the track rail 101, the slide base 103 is curvilinearly guided along the track rail 101.

This type of curvilinear guide apparatus suffers, however, from the following disadvantages. The cam followers 105a and 105b used therein are generally arranged such that the outer wheel 106 of each cam follower is supported by a support shaft 108 so as to be rotatable around the axis of the shaft 108 through a multiplicity of needle rollers 109 which are disposed with their axes extending in the axial direction of the support shaft 108. Accordingly, it is possible to bear a relatively heavy load applied perpendicularly to the axis of the support shaft 108, but it is substantially impossible to bear a load which is applied parallel to the axis of the support shaft 108. Therefore, it is necessary to use jointly or incorporate additional means for bearing a load applied parallel to the axis of the support shaft 108. Thus, the prior art which uses the cam followers 105a and 105b has the problem that the arrangement is complicated.

Further, the prior art suffers from undesirable slide and large frictional resistance occurring between the outer wheel 106 of each of the cam followers 105a and 105b and the corresponding ridge 102 of the track rail 101 at the area of contact between the obliquely upward or downward track surface formed on the ridge 102 and the obliquely downward or upward rolling contact surface of the rolling contact groove 107 formed in the outer wheel 106, and therefore the apparatus is unsuitable for high-speed operations. In addition, if a pre-load is applied between the ridges 102 of the track rail 101 and the cam followers 105a, 105b of the slide base 103, the frictional resistance occurring therebetween becomes larger. Therefore, it is impossible to apply pre-load for the purpose of increasing the degree of accuracy of the slide motion and enhancing the rigidity. Thus, it has heretofore been impossible to produce this type of curvilinear guide apparatus with a high degree of precision.

Accordingly, the present inventor has proposed a curvilinear bearing which is free from the above-described problems of the conventional curvilinear guide apparatus that utilizes cam followers [see Japanese Patent Application Number 62-14,132 (1987)]. More specifically, the proposed curvilinear bearing is arranged such that loads which are applied in four directions, that is, radially outward and inward as well as horizontally leftward and rightward can be born between a track rail and a bearing body which slides along the track rail and it is possible to bear a heavy load by means of balls which are adapted to bear a load substantially uniformly in the area defined between a loaded ball rolling surface formed on the bearing body and a track surface formed on the track rail and also possible to increase the degree of accuracy of the slide motion and enhance the rigidity by applying a pre-load.

As a result of the recent development in industrial technology, there have been demands for guide mechanisms arranged not only to guide an object from a reference position to a target position linearly or curvilinearly with a predetermined curvature but also to guide a variety of combinations of linear and curvilinear motions, i.e., linear ↔ curvilinear, linear ↔ curvilinear ↔ linear, curvilinear → linear ↔ curvilinear, etc. To meet these demands, it is conventional practice to use in combination linear and curvilinear bearings such as those described above. Since the linear and curvilinear bearings use different bearing bodies designed to slide along linear and curvilinear track rails, respectively, it is necessary to deliver an object between the linear and curvilinear bearings, and a complicated machine or apparatus is needed for this delivery. In the case where an object must be secured to the bearing body when moved, it is substantially difficult to conduct the delivery operation. There are cases where it is necessary to assemble a complicated and large-scale apparatus, for example, assemble linear and curvilinear bearings one on top of the other.

OBJECTS AND SUMMARY OF THE INVENTION

Accordingly, it is an object of the present invention to provide a bearing for both linear and curvilinear motions which is so designed that it is possible to guide both linear and curvilinear motions with a single bearing.

It is another object of the present invention to provide a bearing for both linear and curvilinear motions which enables arrangement of a guide mechanism capable of smoothly guiding an object from a reference position to a target position without the need for an object delivering operation even in the case where the object must be guided by a combination of linear and curvilinear motions.

It is still another object of the present invention to provide a bearing for both linear and curvilinear motions which is capable of bearing loads applied in four directions, that is, radially outward and inward as well as horizontally leftward and rightward, between a track rail having linear and curvilinear loaded domains and a bearing body which slides along the track rail.

It is a further object of the present invention to provide a bearing for boty linear and curvilinear motions which is so designed that balls are capable of substantially uniformly bearing a load in the area defined between a loaded ball rolling surface formed on a bearing body and a track surface formed on a track rail, thereby enabling a heavy load to be born and permitting a pre-load to be applied to achieve an increase in the degree of accuracy of slide motions and also enhancement of the rigidity.

To these ends, the present invention provides a bearing for both linear and curvilinear motions which comprises a track rail having a track surface formed longitudinally, a bearing body provided with an endless track having a loaded ball rolling surface facing the track surface and a non-loaded ball recirculating passage which continuously connects with both ends of the loaded ball rolling surface, and a multiplicity of balls which recirculate through the endless track provided in the bearing body to bear a load in the area defined between the loaded ball rolling surface and the track surface of the track rail, wherein the loaded ball rolling surface constituting the endless track in the bearing body is provided with a linear loaded domain and a curvilinear loaded domain having a predetermined curvature, so that, in a linear area of the track surface of the track rail, a load is born by balls rolling on the linear loaded domain, whereas, in a curvilinear area of the track surface of the track rail, a load is born by balls rolling on the curvilinear loaded domain.

In the present invention, the above-described track rail is only required to have a track surface for guiding the bearing body through the balls and therefore may be a linear track rail which is formed merely in a straight-line shape or may be a curvilinear track rail which is formed in an arcing or circular shape with a predetermined curvature. The track rail may also be an odd-shaped track rail having linear and curviliner portions or may be a composite track rail formed by appropriately combining together linear, curvilinear and odd-shaped track rails either with or without ends. A curvilinear area which is formed on the track surface of these track rails is required to curve in a predetermined direction and have a predetermined curvature.

The above-described bearing body may be of any of the following types. Namely, the bearing body may comprise a slide base which has a horizontal portion and sleeve portions extending downward from the left and right sides, respectively, of the horizontal portion so as to have a substantially U-shaped cross-section with a recess defined in the lower side thereof, the slide base having one loaded ball rolling surface provided on the inner side of each of the sleeve portions, and which further has a non-loaded ball passage corresponding to each of the loaded ball rolling surfaces, and a pair of covers which are secured to two axial ends, respectively, of the slide base, each cover having a ball turning passage which defines a non-loaded ball recirculating passage in cooperation with the corresponding non-loaded ball passage. The bearing body may also comprise a slide base which has a horizontal portion and sleeve portions extending downward from the left and right sides, respectively, of the horizontal portion so as to have a substantially U-shaped cross-section with a recess defined in the lower side thereof, the slide base having a pair of adjacent loaded ball rolling surfaces provided on the inner side of each of the sleeve portions, and which further has a non-loaded ball passage corresponding to each of the loaded ball rolling surfaces, and a pair of covers which are secured to two axial ends, respectively, of the slide base, each cover having a ball turning passage which defines a non-loaded ball recirculating passage in cooperation with the corresponding non-loaded ball passage. Further, the bearing body may comprise slide base halves having a substantially rectangular cross-section, each slide base half having a pair of adjacent loaded ball rolling surfaces and a non-loaded ball passage corresponding to each of the loaded ball rolling surfaces, a top plate member stretched between and secured to the respective upper surfaces of the slide base halves, and a pair of covers which are secured to two axial ends, respectively, of the slide base, each cover having a ball turning passage which defines a non-loaded ball recirculating passage in cooperation with the corresponding non-loaded ball passage.

Although it is only necessary to arrange the bearing for both linear and curvilinear motions of the present invention such that the balls rolling on the loaded ball rolling surface of the bearing body mounted on the track rail are prevented from falling through the clearance between the slide base and the track rail, it is preferable to arrange the bearing such that no balls fall even when the bearing body is separated from the track rail. For this purpose, a known ball retainer may be used, but it is preferable to provide a loaded ball groove in the slide base constituting the bearing body, at least the opening width of the loaded ball groove being smaller than the diameter of the balls, and form a loaded ball rolling surface inside this loaded ball groove to thereby prevent the balls from falling even when the bearing body is separated from the track rail. Although there is no special restriction on means for forming such a loaded ball groove, it is preferable to form a loaded ball groove integral with the slide base constituting the bearing body by means of cutting and grinding, or define a loaded ball groove by a combination of a groove portion with a relatively large opening width which is formed in the slide base constituting the bearing body and a groove forming member which is secured to the slide base such as to reduce the opening width of the groove portion.

In the case where the bearing body which constitutes the bearing body is of the type having a horizontal portion and sleeve portions extending downward from the left and right sides, respectively, of the horizontal portion so as to have a substantially U-shaped cross-section with a recess defined in the lower side thereof, the slide base having a pair of adjacent loaded ball rolling surfaces provided on the inner side of each of the sleeve portions, or in the case where the bearing body is defined by slide base halves having a substantially rectangular cross-section, each slide base half having a pair of adjacent loaded ball rolling surfaces, a track rail having track surfaces corresponding to these loaded ball rolling surfaces is employed, whereby the above-described pair of loaded ball rolling surfaces may be arranged to face either in respective directions which converge to each other or in respective directions which diverge from each other.

As to the linear loaded domain and the curvilinear loaded domain having a predetermined curvature, which are formed on the above-described loaded ball rolling surface in the present invention, the loaded ball rolling surface is longitudinally divided into three regions used to form one or two linear loaded domains and one or two curvilinear loaded domains. In the case where the bearing body which constitutes the bearing body is of the type having a substantially U-shaped cross-section and one or two loaded ball rolling surfaces provided on the respective inner sides of the sleeve portions, linear and curvilinear loaded domains must be alternately positioned in such a manner that one loaded ball rolling surface is provided with linear and curvilinear loaded domains which are alternately disposed, e.g., a linear loaded domain ↔ a curvilinear loaded domain ↔ a linear loaded domain, or a curvilinear loaded domain ↔ a linear loaded domain ↔ a curvilinear loaded domain, and with respect to loaded ball rolling surfaces facing each other, a linear loaded domain which is formed on one loaded ball rolling surface faces a curvilinear loaded domain which is formed on the other loaded ball rolling surface. In the case where a pair of loaded ball rolling surfaces are formed on one sleeve portion, linear and curvilinear loaded domains are arranged on each of the loaded ball rolling surfaces in the same sequence.

In the case where the slide base constituting the bearing body is defined by slide base halves having a substantially rectangular cross-section, the above-described linear and curvilinear loaded domains are only required to be alternately formed on each loaded ball rolling surface, e.g., a linear loaded domain ↔ a curvilinear loaded domain ↔ a linear loaded domain, a curvilinear loaded domain ↔ a linear loaded domain ↔ a curvilinear loaded domain, a linear loaded domain ↔ a curvilinear loaded domain, or a curvilinear loaded domain ↔ a linear loaded domain. However, in the case where a pair of bearing bodies are combined together to form a bearing assembly so as to be able to bear loads which are applied in four directions, that is, radially outward and inward as well as horizontally leftward and rightward, the relationship between linear and curvilinear loaded domains formed on each loaded ball rolling surface in the bearing assembly must be the same as the relationship in the case of the bearing body defined by a slide base which is formed with a substantially U-shaped cross-section and which has one or two loaded ball rolling surfaces formed on the respective inner sides of two sleeve portions.

The number of balls which roll on each of the linear and curvilinear loaded domains formed on each loaded ball rolling surface may be appropriately selected in accordance with various conditions, for example, the size of a bearing which is to be formed, the material therefor, the magnitude of a load which may be applied thereto, the size of balls used, etc. However, the sum total of balls which are positioned within the two domains among three longitudinally divided domains which are respectively located at the longitudinal end portions of the loaded ball rolling surface is preferably made substantially coincident with the number of balls which are positioned in the intermediate domain, thereby balancing the number of balls loaded at one loaded ball rolling surface with the number of balls loaded at the other loaded ball rolling surface, and thus enabling a horizontal momental load to be born substantially uniformly.

In the bearing for both linear and curvilinear motions according to the present invention, the center of the imaginary circle of a curvilinear loaded domain formed on a loaded ball rolling surface of the bearing body is preferably made coincident with the center of the imaginary circle of a curvilinear area formed on the track rail, thereby enabling an increase in the rate of contact of balls rolling through the area defined between a curvilinear loaded domain of a loaded ball rolling surface formed on the bearing body and the corresponding curvilinear area of the track surface of the track rail. As a result, it becomes possible for the balls to bear a load substantially uniformly, and therefore a smooth slide motion is obtained.

In the bearing for both linear and curvilinear motions according to the present invention, a linear loaded domain and a curvilinear loaded domain having a predetermined curvature are formed on a loaded ball rolling surface which constitutes an endless track provided in the bearing body, so that, in a linear area of the track surface of the track rail, a load is born by balls rolling on the linear loaded domain, whereas, in a curvilinear area of the track surface of the track rail, a load is born by balls rolling on the curvilinear loaded domain. Thus, it is possible to perform both linear and curvilinear guide operations with a single bearing.

Accordingly, the bearing for both linear and curvilinear motions according to the present invention is capable of performing linear and curvilinear guide operations along linear and curvilinear track rails, respectively, while bearing a load, and therefore applicable to a great variety of uses.

DETAILED DESCRIPTION OF THE PREFERRED EMBODIMENTS

Figure 1:
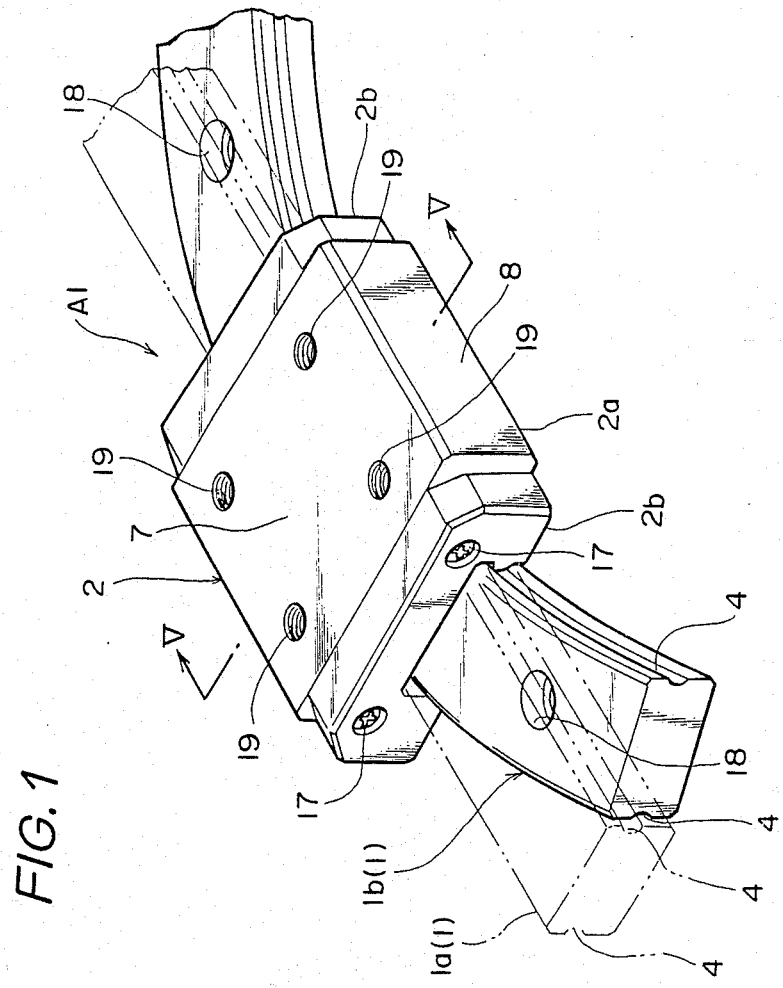
FIG. 1 is a perspective view of a bearing for linear and curvilinear motions according to a first embodiment of the present invention.
Figure 2:
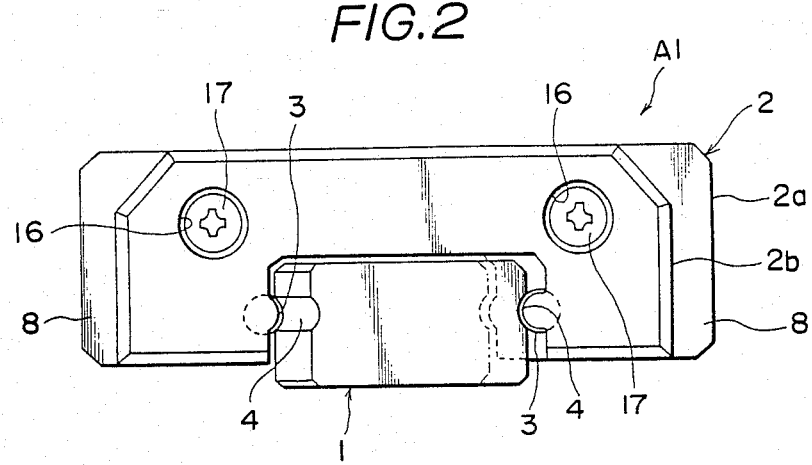
FIG. 2 is a front view of the bearing shown in FIG. 1.

The bearing for both linear and curvilinear motions according to the present invention will be described hereinunder more specifically by way of embodiments and with reference to the accompanying drawings.

FIGS. 1 to 8 show in combination a bearing A1 for both linear and curvilinear motions according to a first embodiment of the present invention.

The bearing A1 comprises a track rail 1 having track surfaces 4 formed longitudinally, a bearing body 2 provided with endless tracks each having a loaded ball rolling surface 5 facing the corresponding track surface 4 and a non-loaded ball recirculating passage 6 which continuously connects with both ends of the loaded ball rolling surface 5, and a multiplicity of balls 3 which recirculate through the endless tracks in the bearing body 2 to bear a load within the area defined between each loaded ball rolling surface 5 of the bearing body 2 and the corresponding track surface 4 of the track rail 1.

In the first embodiment, the bearing body 2 comprises a slide base 2a and a pair of covers 2b. The slide base 2a has a horizontal portion 7 and a pair of sleeve portions 8 extending downward from the left and right sides, respectively, of the horizontal portion 7 such as to define a recess in the lower side thereof. Each sleeve portion 8 has one loaded ball groove 9 formed in the inner side surface, the groove 9 having the above-described loaded ball rolling surface 5 formed on the inner side thereof. The sleeve portion 8 further has a non-loaded ball bore 6a longitudinally formed parallel to the loaded ball groove 9, the non-loaded ball bore 6a defining a part of the above-described non-loaded ball recirculating passage 6. The pair of covers 2b are secured to two axial end faces, respectively, of the slide base 2a such that the covers 2b provide communication between the loaded ball grooves 9 and the corresponding non-loaded ball bores 6a to form the endless recirculating passages 6 for the ball 3. The loaded ball grooves 9 are formed integral with the slide base 2a by means of cutting and grinding such that the inner diameter thereof is larger than the diameter d of the balls 3, while the opening width l is smaller than the ball diameter d, thereby enabling the balls 3 to roll freely along the loaded ball rolling surfaces 5 formed inside the loaded ball grooves 9 and, at the same time, preventing the balls 3 from falling from the loaded ball grooves 9 even when the bearing body 2 is separated from the track rail 1.

Figure 7:
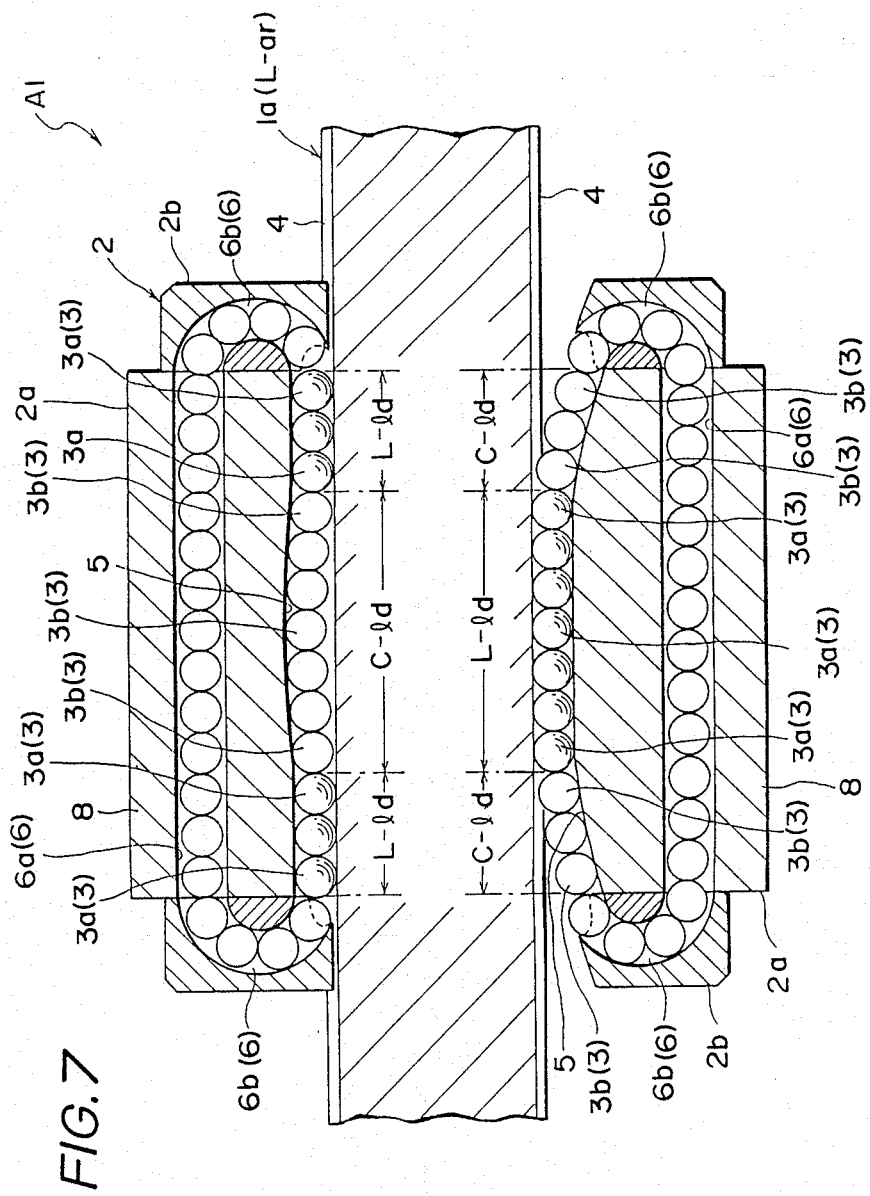
FIG. 7 is a sectional view taken along the line VII—VII of FIG. 5, which shows the arrangement in the case where the track rail is a linear track rail.
Figure 8:
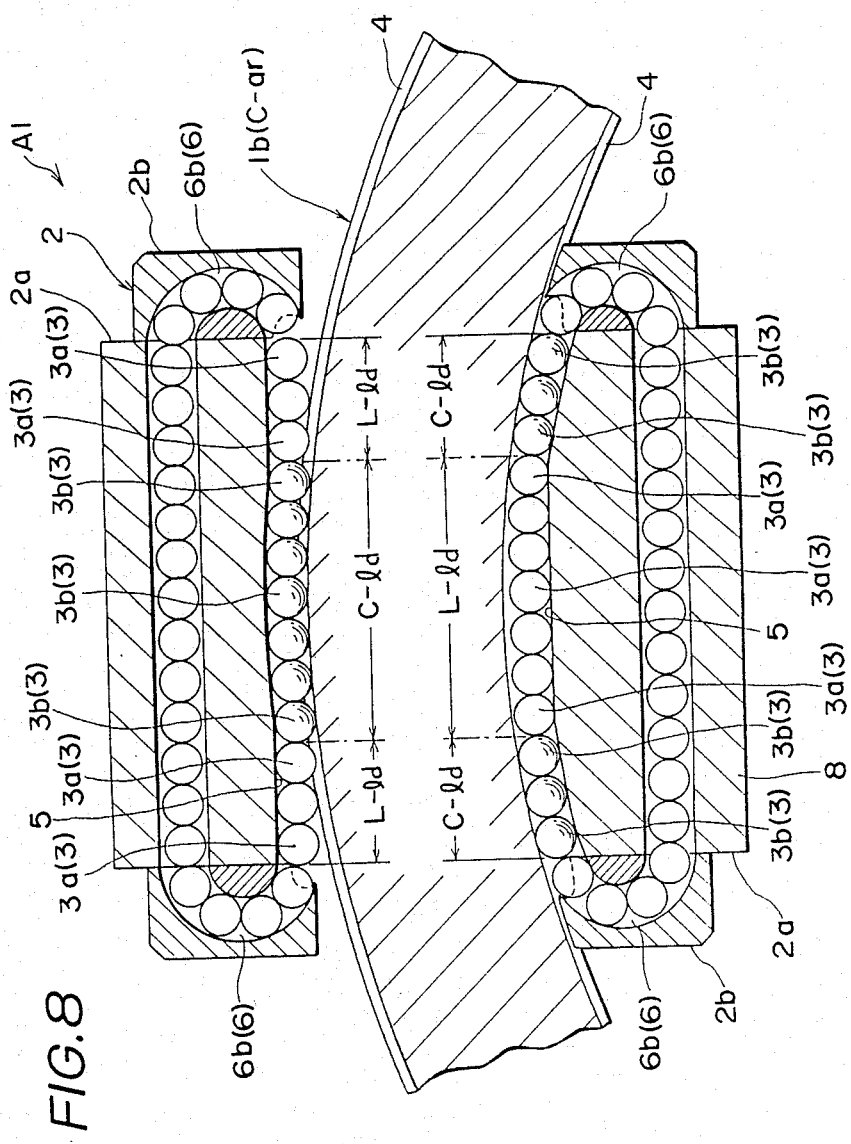
FIG. 8 is a sectional view taken along the line VII—VII of FIG. 5, which shows the arrangement in the case where the track rail is a curvilinear track rail.
Figure 9:
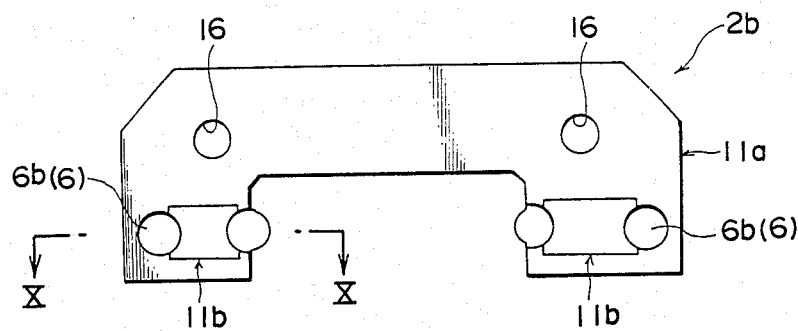
FIG. 9 is a bottom view of one of the covers shown in FIG. 1.
Figure 10:
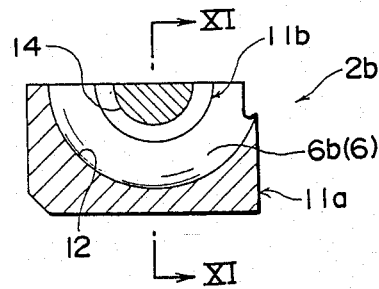
FIG. 10 is a sectional view taken along the line X—X of FIG. 9.
Figure 11:
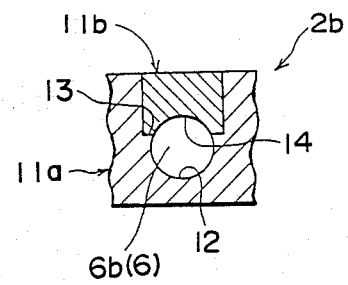
FIG. 11 is a sectional view taken along the line XI—XI of FIG. 10.
Figure 12:
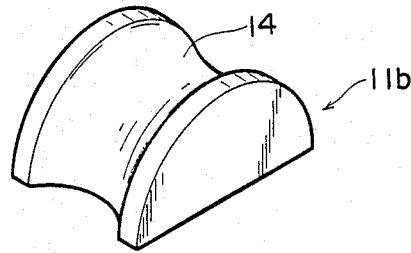
FIG. 12 is a perspective view of one of a pair of cover pieces.

The loaded ball rolling surfaces 5 of the bearing body 2 that constitute endless tracks are arranged as shown in FIGS. 7 and 8. More specifically, one sleeve portion 8 is provided with two linear loaded domains L-1$d$ and one curvilinear loaded domain C-1$d$ having a predetermined curvature, while the other sleeve portion 8 is provided with one linear loaded domain L-1$d$ and two curvilinear loaded domains C-1$d$. The linear and curvilinear loaded domains L-1$d$ and C-1$d$ formed on the loaded ball rolling surfaces 5 of the two sleeve portions 8 are alternately disposed such that, if linear and curvilinear domains for one sleeve portion 8 are disposed in the following sequence, i.e., a linear loaded domain L-1$d$ ↩ a curvilinear loaded domain C-1$d$ ↩ a linear loaded domain L-1$d$, linear and curvilinear domains for the other sleeve portion 8 are disposed in the following sequence, i.e., a curvilinear loaded domain C-1$d$ ↩ a linear loaded domain L-1$d$ ↩ a curvilinear loaded domain C-1$d$. Thus, a linear loaded domain L-1$d$ (curvilinear loaded domain C-1$d$) which is formed on the loaded ball rolling surface 5 of one sleeve portion 8 faces a curvilinear loaded domain C-1$d$ (linear loaded domain L-1$d$) which is formed on the loaded ball rolling surface 5 of the other sleeve portion 8. Further, the centers of the imaginary circles of all the curvilinear loaded domains C-1$d$ formed on the loaded ball rolling surfaces 5 are coincident with each other. The linear and curvilinear loaded domains L-1$d$ and C-1$d$ are arranged such that, within linear areas L-ar on the track surfaces 4 of the track rail 1, the linear loaded domains L-1$d$ bear a load through balls 3$a$ rolling thereon, whereas, within curvilinear areas C-ar on the track surfaces 4 of the track rail 1, the curvilinear loaded domains C-1$d$ bear a load through balls 3$b$ rolling thereon. The numbers of balls 3 rolling on the linear and curvilinear loaded domains L-1$d$ and C-1$d$ formed on each loaded ball rolling surface 5 are set so as to be 3 ↩ 7 ↩ 3. Thus, when the sum total of balls which are bearing a load at two longitudinal end portions of one loaded ball rolling surface 5 is six, the number of balls bearing a load at the intermediate portion of the other loaded ball rolling surface 5 is seven. Accordingly, the left- and right-hand sides of the bearing A1 balance with each other, so that a horizontal momental load can be born substantially uniformly.

The track rail 1 comprises a linear track rail member 1$a$ which defines the linear areas L-ar of the track surfaces 4 and an arcing curvilinear track rail member 1$b$ which defines the curvilinear areas C-ar of the track surfaces 4. The arrangement is such that, when the bearing body 2 is sliding along the curvilinear track rail member 1$b$, the centers of the imaginary circles of all the curvilinear loaded domains C-1$d$ formed on the bearing body 2 are coincident with the center (denoted by the reference symbol O in FIG. 13) of the imaginary circle of the curvilinear track rail member 1$b$.

Figure 3:
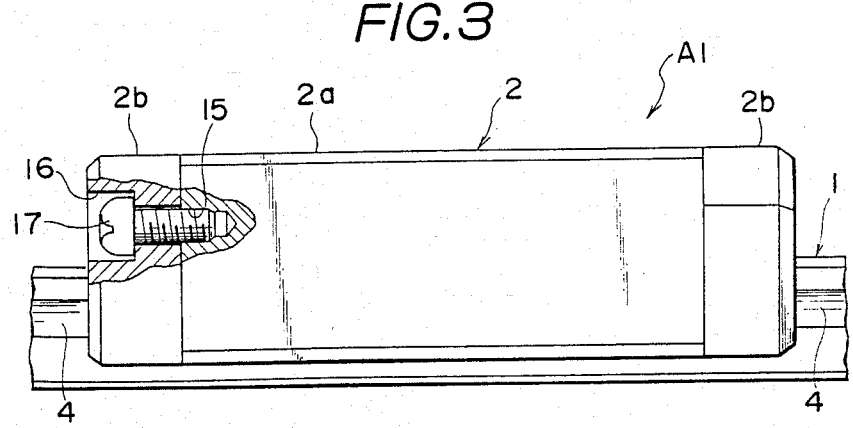
FIG. 3 is a side view of the bearing shown in FIG. 1.
Figure 4:
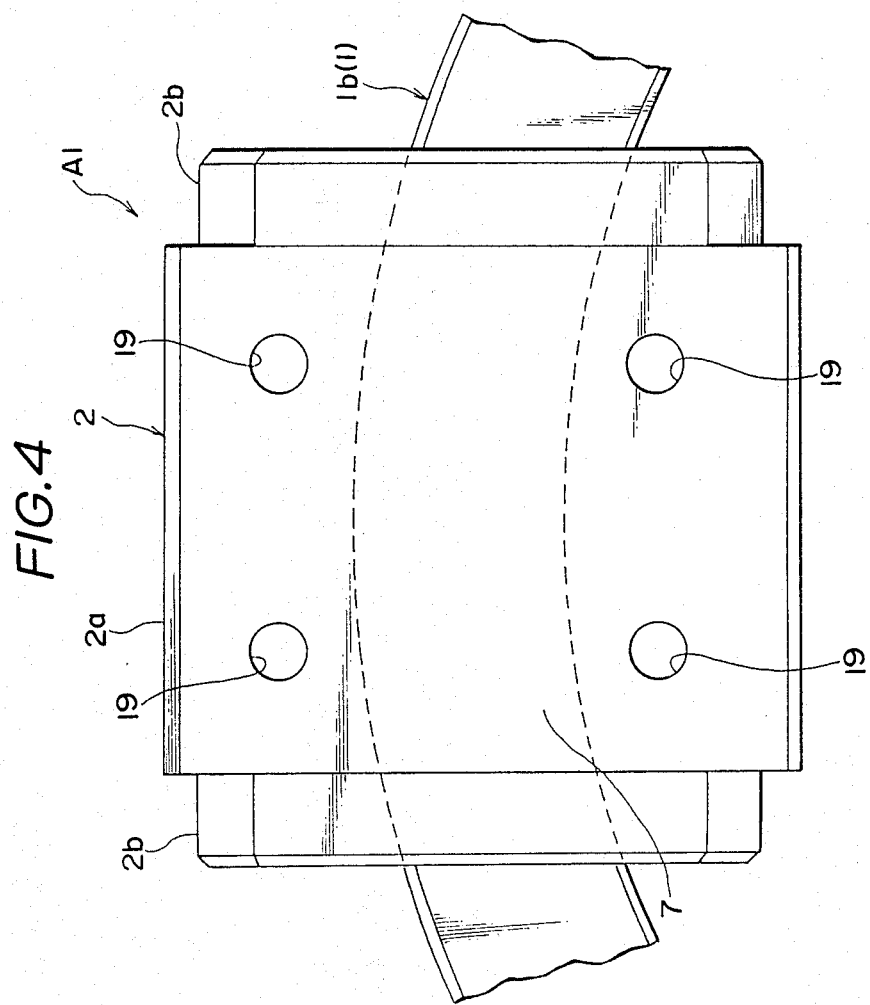
FIG. 4 is a plan view of the bearing shown in FIG. 1.
Figure 5:
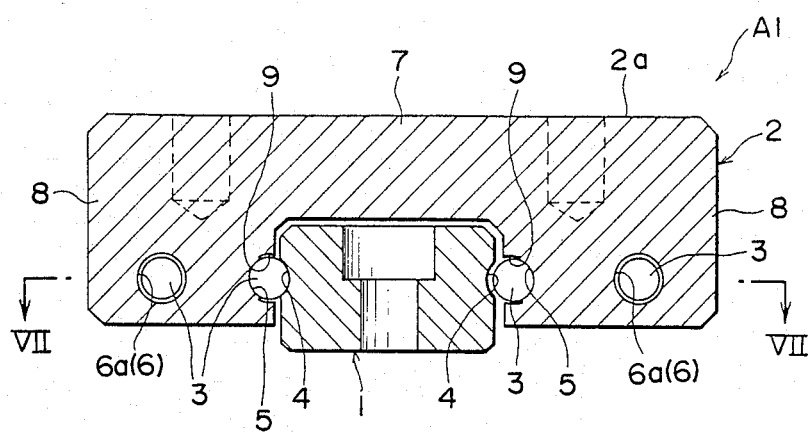
FIG. 5 is a sectional view taken along the line V—V of FIG. 1.
Figure 6:
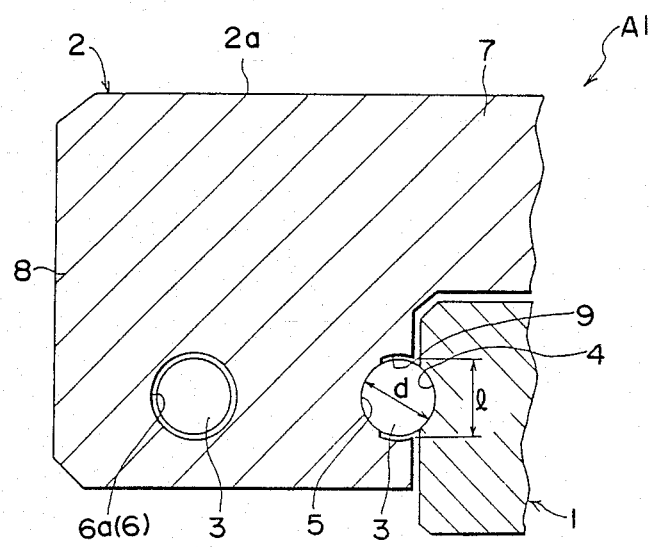
FIG. 6 is an enlarged sectional view of the left-hand half of FIG. 5.

In the first embodiment, each of the covers 2$b$ which are secured to two axial end faces, respectively, of the slide base 2$a$ comprises a cover body 11$a$ and a pair of cover pieces 11$b$ which are secured to two sleeve portions, respectively, of the cover body 11$a$, as shown in FIGS. 9 to 12, so that the end portion of each loaded ball groove 9 formed in the slide base 2$a$ and the end portion of the corresponding non-loaded ball bore 6$a$ are communicated with each other through a ball turning passage 6$b$ to thereby form endless tracks for the balls 3. More specifically, the cover body 11$a$ is provided in its inner side with grooves 12 having a substantially semi-circular configuration in plan view, and a securing step portion 13 for firmly fitting each of the cover pieces 11$b$ is formed at the opening edge of each groove 12. Each cover piece 11$b$ has a circumferential groove 14 which defines a ball turning passage 6$b$ in cooperation with the corresponding groove 12 when the cover piece 11$b$ is fitted to the corresponding securing step portion 13 of the cover body 11$a$. The covers 2$b$ are secured to the slide base 2$a$ as follows. As shown in FIG. 3, bolt receiving bores 15 are provided in the axial end portions of the slide base 2$a$, while each cover 2$b$ is provided with stepped bolt receiving bores 16 respectively corresponding to the bolt receiving bores 15, and securing bolts 17 are respectively passed through the stepped bolt receiving bores 16 in the cover 2$b$ and screwed into the bolt receiving bores 15 in the slide base 2$a$.

Figure 13:
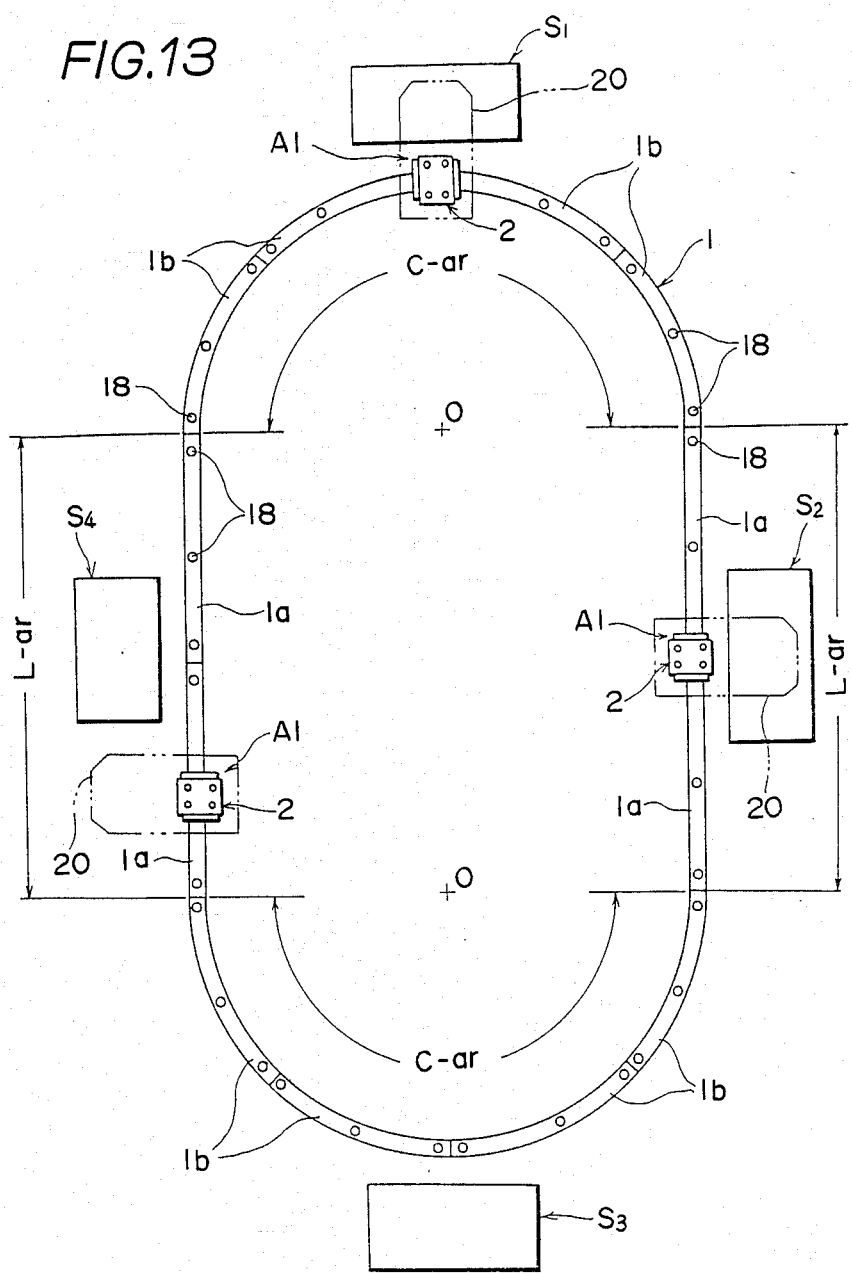
FIG. 13 shows a parts conveyor system having a track rail which is formed in the shape of an athletic track from linear and curvilinear track rails.

It should be noted that, in FIGS. 1, 4, 5, 7, 8 and 13, the reference numeral 18 denotes through-holes which are bored in each track rail 1 to receive securing bolts for securing the track rail 1 to a desired one of various machines or apparatuses, while the numeral 19 denotes bolt receiving bores for thread engagement with securing bolts used when a table 20 such as that shown by the imaginary line in FIG. 13 is secured to the slide base 2$a$.

According to the bearing A1 of the first embodiment, for example, as shown in FIG. 13, a plurality of linear track rail members 1$a$ and a plurality of curvilinear track rail members 1$b$ are combined together to form an athletic track-shaped track rail 1, and stations S1 to S4 for, for example, delivering parts, are disposed at appropriate positions along the track rail 1. On the other hand, a table 20 is secured to each of the bearing bodies 2 which slide along the track rail 1. When these bearing bodies 2 are slid along the track rail 1, within each linear area L-ar of the track rail 1, a load is born by the balls 3$a$ rolling on the linear loaded domains L-1$d$ of each bearing body 2, whereas, within each curvilinear area C-ar of the track rail 1, a load is born by the balls 3$b$ rolling on the curvilinear loaded domains C-1$d$ of each bearing body 2. Thus, it is possible to make each bearing body 2 go around the track rail 1 having the linear and curvilinear areas L-ar and C-ar while bearing a load, and it is therefore possible to assemble a conveyor system in which parts are delivered between the stations S1 to S4 and the tables 20 going around the track rail 1 on the respective bearing bodies 2.

Figure 14:
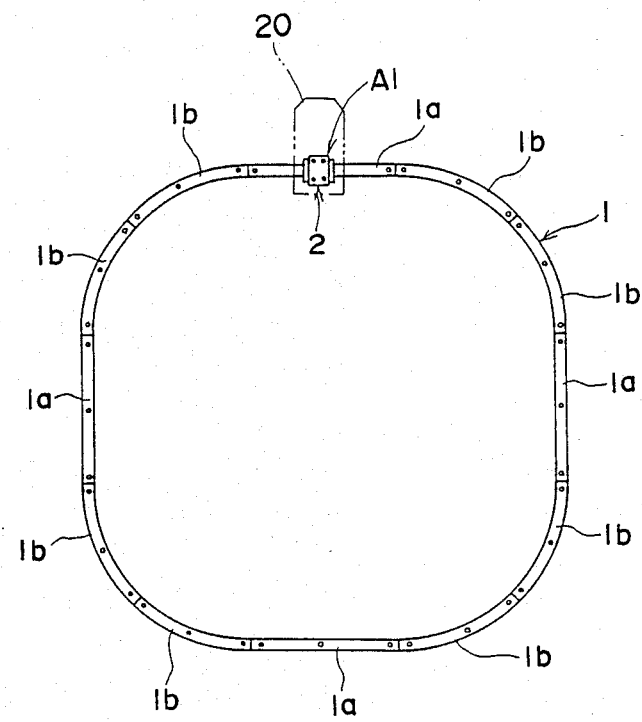
FIGS. 14 and 15 respectively show track rails formed in other shapes.
Figure 15:
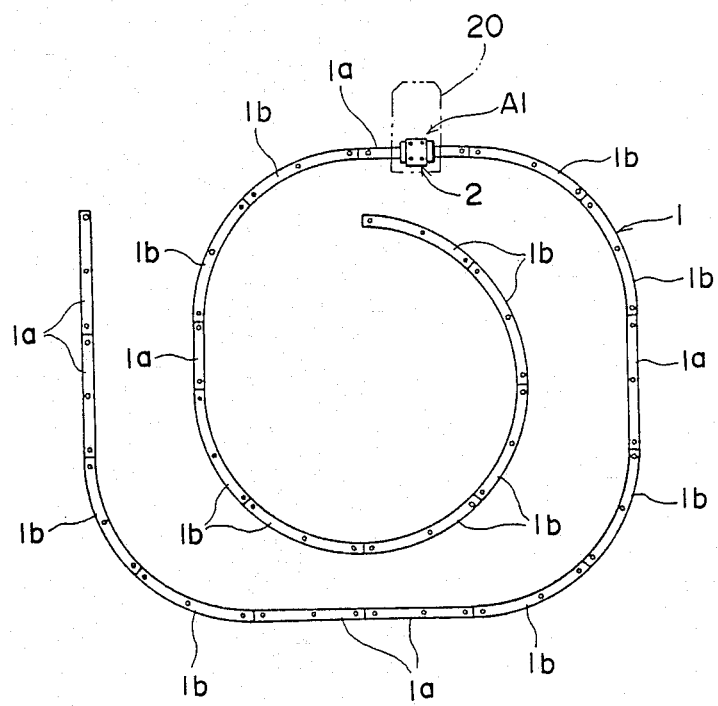

It should be noted that the configuration of the track rail 1 formed by combining together a plurality of linear track rail members 1$a$ and a plurality of curvilinear track rail members 1$b$ is not necessarily limitative to the athleteic track shape shown in FIG. 13 but may be a desired shape, for example, a substantially square shape such as that shown in FIG. 14 or a spiral shape such as that shown in FIG. 15.

Figure 16:
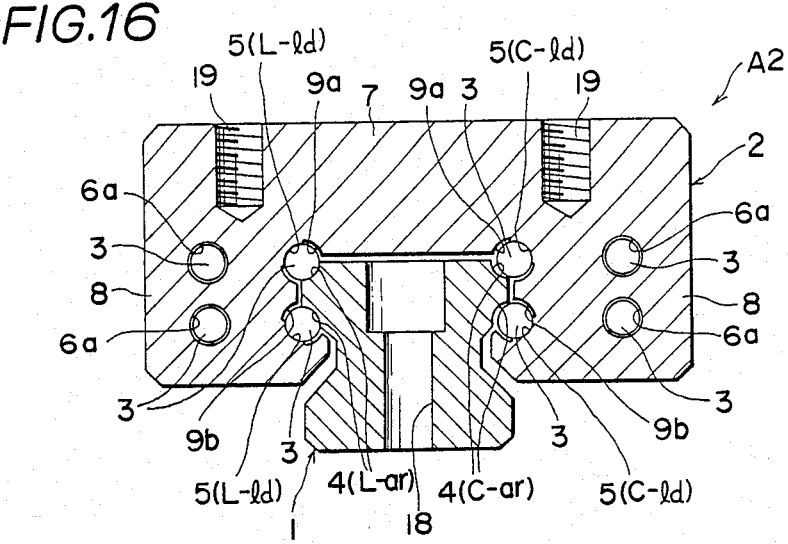
FIG. 16 is a sectional view similar to FIG. 5, which shows a bearing for both linear and curvilinear motions according to a second embodiment of the present invention.
Figure 17:
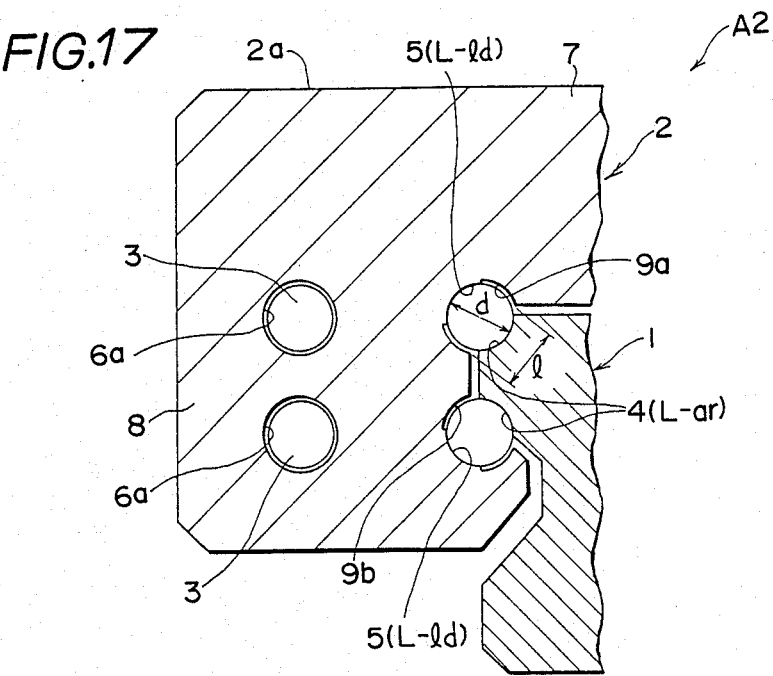
FIG. 17 is an enlarged view of the left-hand half of FIG. 16.

FIGS. 16 and 17 show in combination a bearing A2 for both linear and curvilinear motions according to a second embodiment of the present invention. Unlike the above-described first embodiment, the second embodiment has a pair of upper and lower loaded ball grooves 9$a$ and 9$b$ which are formed in the inner side surface of each of the sleeve portions 8 of the slide base 2$a$ constituting the bearing body 2. Each of the loaded ball grooves 9$a$ and 9$b$ is formed integral with the slide base 2$a$ by means of cutting and grinding such that the inner diameter thereof is larger than the diameter d of the balls 3 and the opening width l is smaller than the ball diameter d in the same way as in the first embodiment. Further, the loaded ball rolling surfaces 5 which are formed inside the upper and lower loaded ball grooves 9a and 9b located at one side, that is, either the left- or right-hand side, are slanted at 45° so as to face in respective directions which converge so as to intersect each other at 90°, thereby making it possible to bear uniformly loads applied in radially outward and inward as well as horizontally leftward and rightward.

In the bearing A2 of the second embodiment, two pairs of left and right endless tracks which are located at the upper and lower portions, respectively, of the sleeve portions 8 are so formed that the relationship between the linear and curvilinear loaded domains L-1d and C-1d of the loaded ball rolling surface 5 formed inside each of the loaded ball grooves 9a and 9b is the same as that in the arrangement shown in FIGS. 7 and 8. Further, in the loaded ball rolling surfaces 5 formed inside the loaded ball grooves 9a and 9b in the upper and lower endless tracks which are formed in one sleeve portion 8, that is, either the left- and right-hand side sleeve portion 8, the relationship between the linear and curvilinear loaded domains L-1d and C-1d of the loaded ball rolling surface 5 in the loaded ball groove 9a is the same as that in the loaded ball groove 9b. More specifically, if the loaded ball rolling surface 5 of the upper endless track has linear and curvilinear domains L-1d and C-1d in the following sequence, i.e., a linear loaded domain L-1d↔a curvilinear loaded domain C-1d↔ a linear loaded domain L-1d, the loaded ball rolling surface 5 of the lower endless track also has linear and curvilinear domains L-1d and C-1d disposed in the same sequence.

Thus, the bearing A2 of the second embodiment is also capable of sliding on the linear and curvilinear areas L-ar and C-ar of the track surfaces 4 of the track rail 1 while bearing a load at the linear and curvilinear loaded domains L-1d and C-1d, respectively, of the loaded ball rolling surfaces 5 formed on the bearing body 2 in the same way as in the first embodiment.

Figure 18:
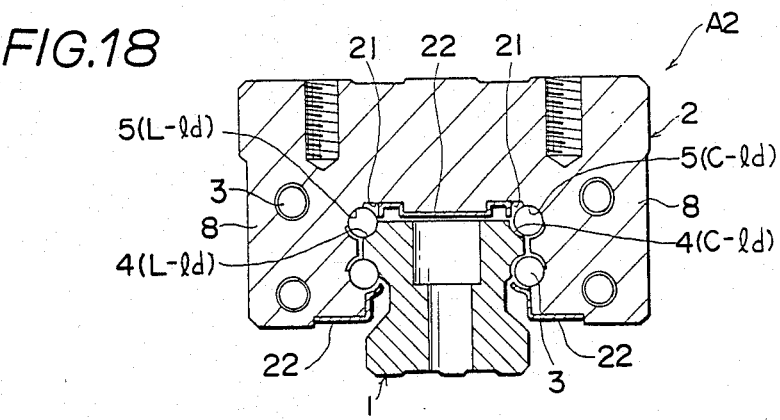
FIGS. 18 to 20 are sectional views similar to FIG. 16, which respectively show modifications of the second embodiment.
Figure 19:
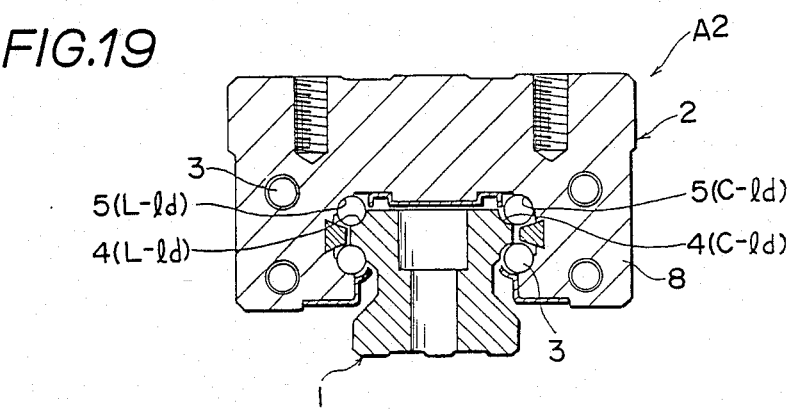
Figure 20:
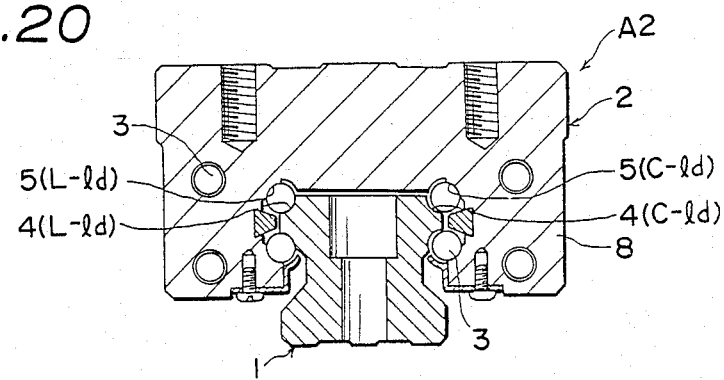

It should be noted that FIGS. 18 to 20 show bearings A2 for both linear and curvilinear motions according to modifications of the above-described second embodiment. More specifically, unlike the arrangement shown in FIG. 16, these modifications are arranged such that a pair of upper and lower loaded ball grooves 9a and 9b which are formed in the inner side surface of each sleeve portion 8 of the slide base 2a constituting the bearing body 2 are defined by a groove portion 21 formed in the slide base 2a and a groove forming member 22 secured to the slide base 2a so that the inner diameter of each of the loaded ball grooves 9a and 9b is larger than the diameter of the balls 3 and the opening width thereof is smaller than the ball diameter. In addition, the spacing between the pair of upper and lower non-loaded ball bores 6a formed in each sleeve portion 8 is made slightly larger than the spacing between the loaded ball grooves 9a and 9b. The bearings A2 according to these modifications are also capable of linearly and curvilinearly sliding on the linear and curvilinear areas L-ar and C-ar of the track surfaces 4 of the track rail 1 while bearing a load at the linear and curvilinear loaded domains L-1d and C-1d, respectively, of the loaded ball rolling surfaces 5 formed on the bearing body 2 in the same way as in the embodiment shown in FIG. 16.

Figure 21:
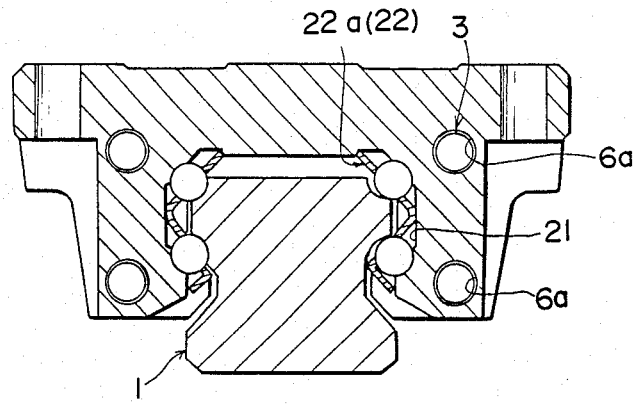
FIGS. 21 and 22 are sectional views similar to FIG. 16, which respectively show other modifications of the second embodiment.
Figure 22:
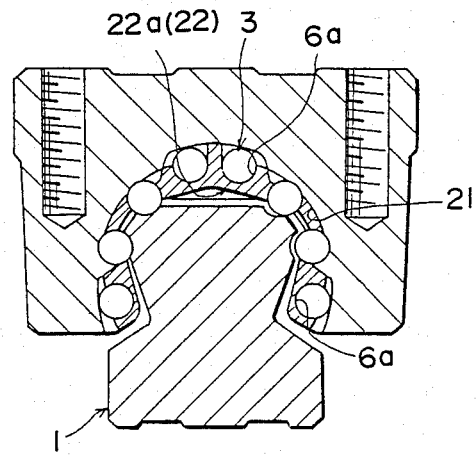

FIGS. 21 and 22 show other modifications of the above-described second embodiment. Unlike the arrangements shown in FIGS. 16 and 18 to 20, these modifications are arranged such that a relatively wide groove portion 21 is formed in each of the opposing inner surfaces of the slide base 2a constituting the bearing body 2 and a loaded ball rolling surface 5 is formed along each corner of the groove portion 21. In addition, a ball retainer 22a is disposed on each inner surface of the slide base 2a for preventing the balls 3 from falling from each loaded ball rolling surface 5 when the bearing body 2 is separated from the track rail 1, the ball retainer 22a also serving as a groove forming member 22. In the modification shown in FIG. 22, non-loaded ball bores 6a are also defined by the combination of a groove portion 21 and a ball retainer 22a.

Figure 23:
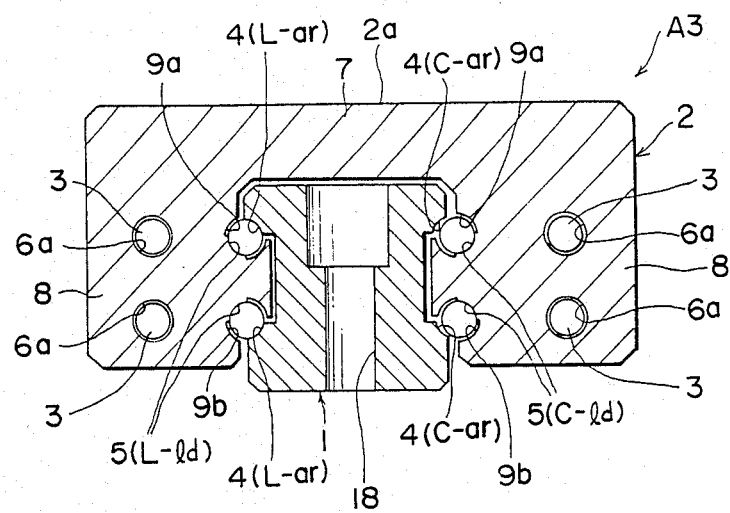
FIG. 23 is a sectional view similar to FIG. 5, which shows a bearing for both linear and curvilinear motions according to a third embodiment of the present invention.
Figure 24:
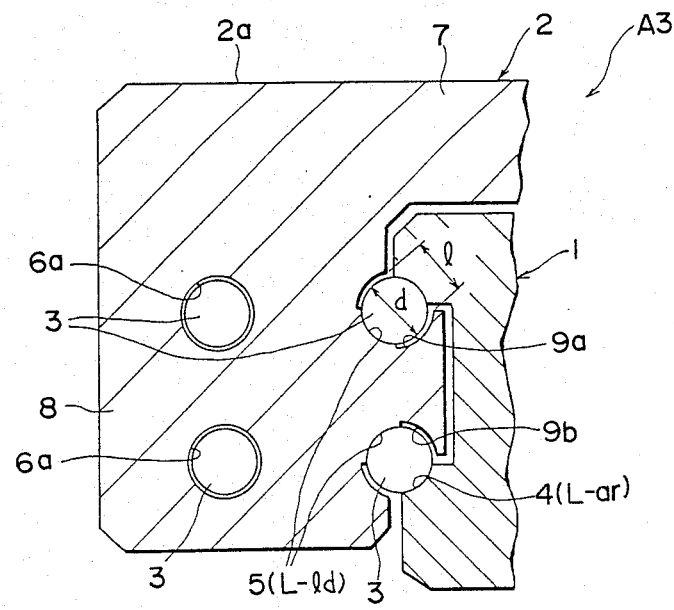
FIG. 24 is an enlarged sectional view of the left-hand half of FIG. 23.

FIGS. 23 and 24 show in combination a bearing A3 for both linear and curvilinear motions according to a third embodiment of the present invention. The third embodiment is similar to the above-described second embodiment except that the loaded ball rolling surfaces 5 which are formed inside the upper and lower loaded ball grooves 9a and 9b provided in one sleeve portion 8, that is, either the left- or right-hand sleeve portion 8, are slanted at 45° so as to face in respective directions which diverge at 90° with respect to each other, thereby making it possible to bear uniformly loads applied in radially outward and inward as well as horizontally leftward and rightward.

The bearing A3 of the third embodiment is also capable of sliding on the linear and curvilinear areas L-ar and C-ar of the track surfaces 4 of the track rail 1 while bearing a load at the linear and curvilinear loaded domains L-1d and C-1d, respectively, of the loaded ball rolling surfaces 5 formed on the bearing body 2 in the same way as in the first embodiment.

Figure 25:
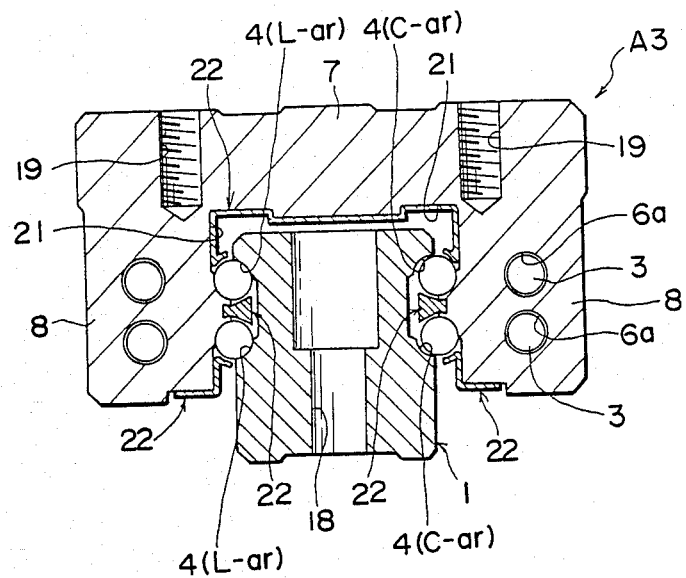
FIG. 25 is a sectional view similar to FIG. 24, which shows a modification of the third embodiment.

FIG. 25 shows a bearing A3 for both linear and curvilinear motions according to a modification of the above-described third embodiment. Unlike the arrangement shown in FIG. 23, this modification is arranged such that a pair of upper and lower loaded ball grooves 9a and 9b which are formed in the inner side surface of each sleeve portion 8 of the slide base 2a constituting the bearing body 2 are defined by a groove portion 21 formed in the slide base 2a and a groove forming member 22 secured to the slide base 2a such that the inner diameter of each of the grooves 9a and 9b is larger than the diameter of the balls and the opening width thereof is smaller than the ball diameter. The bearing A3 of this modification is also capable of sliding on the linear and curvilinear areas L-ar and C-ar of the track surfaces 4 of the track rail 1 while bearing a load at the linear and curvilinear loaded domains L-1d and C-1d, respectively, of the loaded ball rolling surfaces 5 formed on the bearing body 2 in the same way as in the third embodiment shown in FIG. 23.

Figure 26:
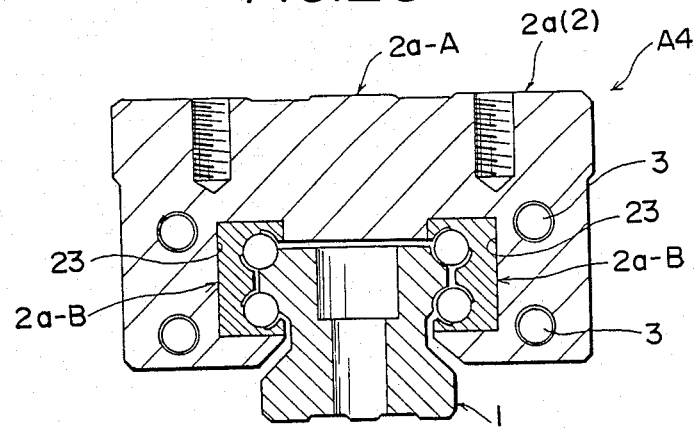
FIG. 26 is a sectional view similar to FIG. 5, which shows a bearing for both linear and curvilinear motions according to a fourth embodiment of the present invention.
Figure 27:
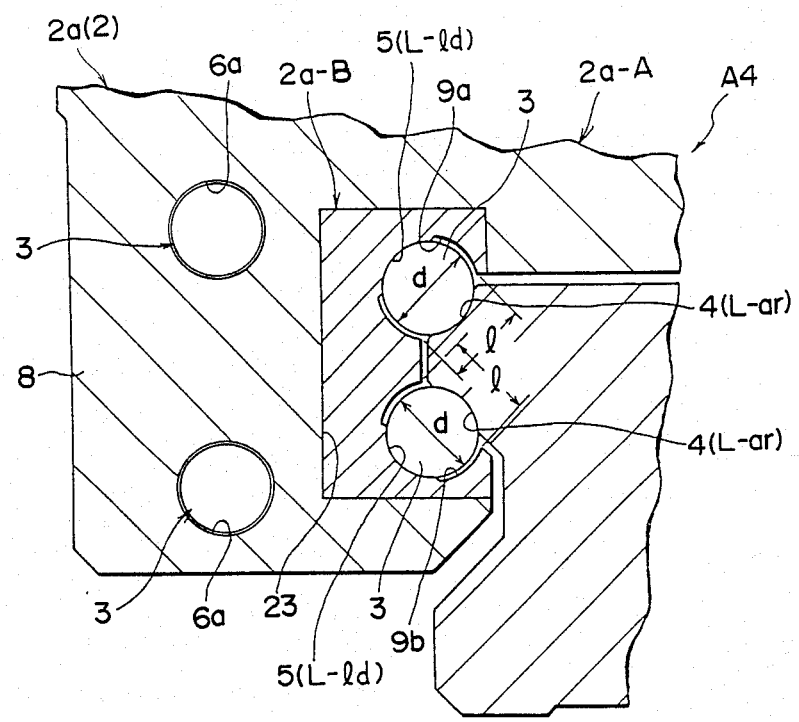
FIG. 27 is an enlarged sectional view of a part of FIG. 26.
Figure 28:
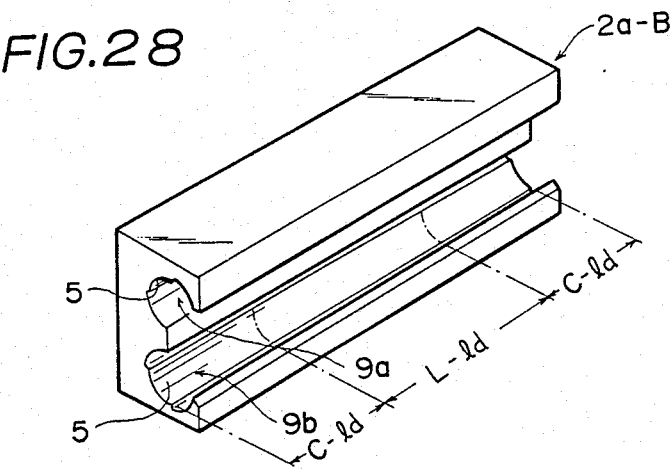
FIG. 28 is a perspective view of the bearing race shown in FIG. 27.

FIGS. 26 to 28 show in combination a bearing A4 for both linear and curvilinear motions according to a fourth embodiment of the present invention. This embodiment is similar to the above-described second embodiment except that the slide base 2a constituting the bearing body 2 comprises a slide base body 2a-A having fitting grooves 23 formed in the respective inner side surfaces of two sleeve portions 8 and a pair of bearing races 2a-B which are respectively fitted in the fitting grooves 23 provided in the slide base body 2a-A. Each bearing race 2a-B is provided with a pair of upper and lower loaded ball grooves 9a and 9b having an inner diameter which is larger than the diameter of the balls 3 and an opening width which is smaller than the ball diameter. The bearing A4 of the fourth embodiment is also capable of sliding on the linear and curvilinear areas L-ar and C-ar of the track surfaces 4 of the track rail 1 while bearing a load at the linear and curvilinear loaded domains L-1d and C-1d, respectively, of the loaded ball rolling surfaces 5 formed on the bearing body 2 in the same way as in the above-described second embodiment.

Figure 29:
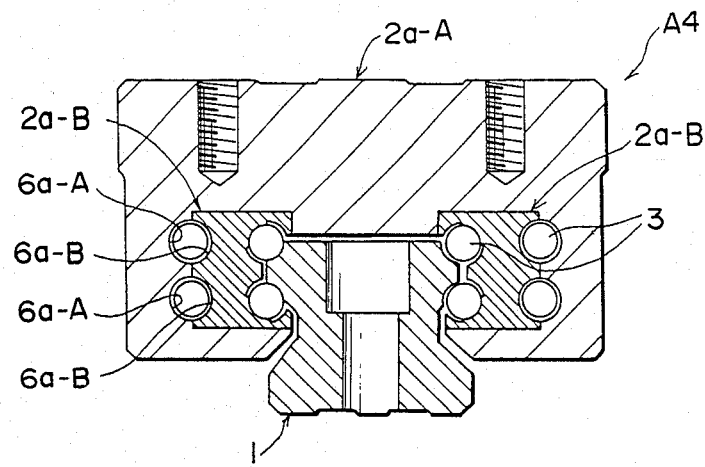
FIG. 29 is a sectional view similar to FIG. 26, which shows a modification of the fourth embodiment.
Figure 30:
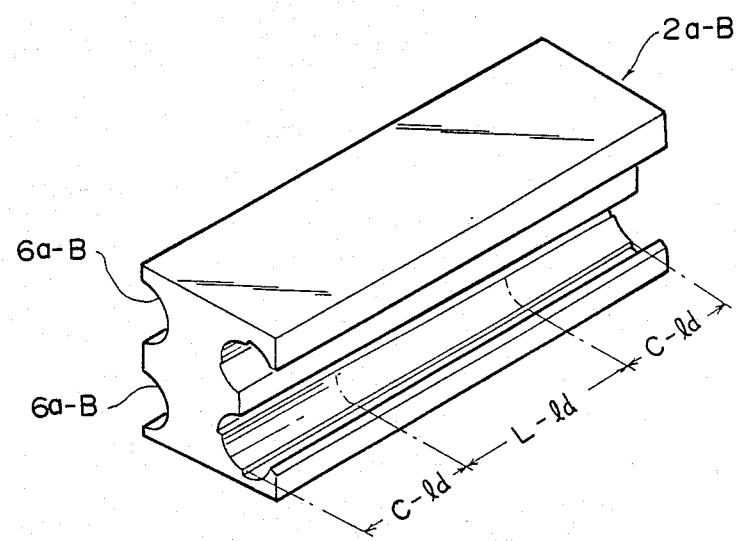
FIG. 30 is a perspective view of one of the bearing races shown in FIG. 29.

FIGS. 29 and 30 show in combination a modification of the bearing A4 for both linear and curvilinear motions according to the above-described fourth embodiment. Unlike the arrangement shown in FIG. 26, this modification is arranged such that the non-loaded ball bores 6a which are formed in the slide base 2a constituting the bearing body 2 are defined by grooves 6a-A formed in the slide base body 2a-A and the corresponding grooves 6a-B which are formed in the bearing races 2a-B. The bearing A4 of this modification is also capable of sliding on the linear and curvilinear areas L-ar and C-ar of the track surfaces 4 of the track rail 1 while bearing a load at the linear and curvilinear loaded domains L-1d and C-1d, respectively, of the loaded ball rolling surfaces 5 formed on the bearing body 2 in the same way as in the above-described fourth embodiment.

Figure 31:
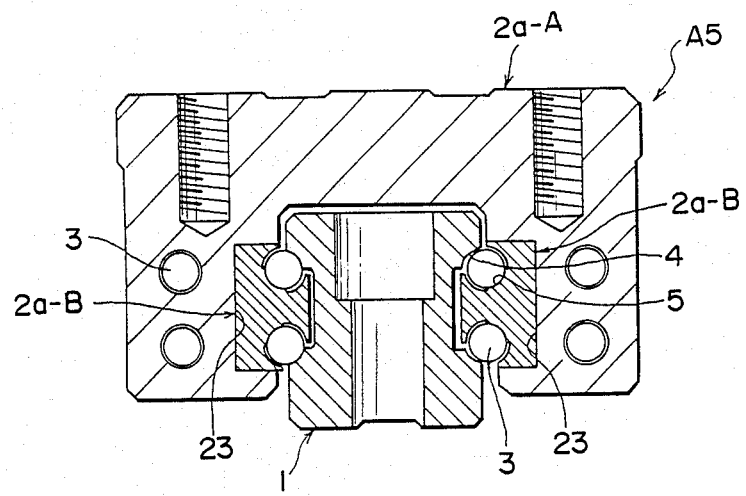
FIG. 31 is a sectional view similar to FIG. 5, which shows a bearing for both linear and curvilinear motions according to a fifth embodiment of the present invention.
Figure 32:
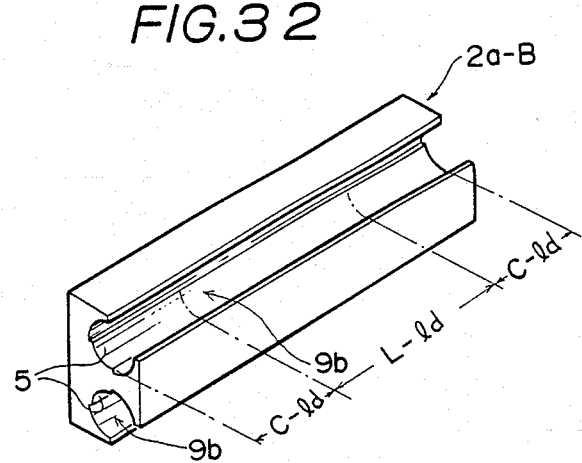
FIG. 32 is a perspective view of one of the bearing races shown in FIG. 31.

FIGS. 31 and 32 show in combination a bearing A5 for both linear and curvilinear motions according to a fifth embodiment of the present invention. This embodiment is similar to the above-described third embodiment except that the slide base 2a constituting the bearing body 2 comprises a slide base body 2a-A having fitting grooves 23 formed in the respective inner side surfaces of two sleeve portions 8 thereof and a pair of bearing races 2a-B which are respectively fitted into the fitting grooves 23 provided in the slide base body 2a-A. Each bearing race 2a-B is provided with a pair of upper and lower loaded ball grooves 9a and 9b having an inner diameter which is larger than the diameter of the balls 3 and an opening width which is smaller than the ball diameter in the same way as in the third embodiment. The bearing A5 of the fifth embodiment is also capable of sliding on the linear and curvilinear areas L-ar and C-ar of the track surfaces 4 of the track rail 1 while bearing a load at the linear and curvilinear loaded domains L-1d and C-1d, respectively, of the loaded ball rolling surfaces 5 formed on the bearing body 2 in the same way as in the third embodiment.

Figure 33:
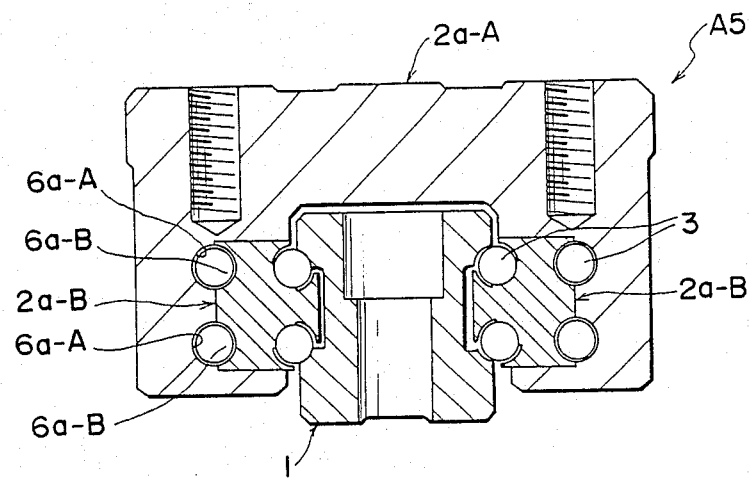
FIG. 33 is a sectional view similar to FIG. 31, which shows a modification of the fifth embodiment.
Figure 34:
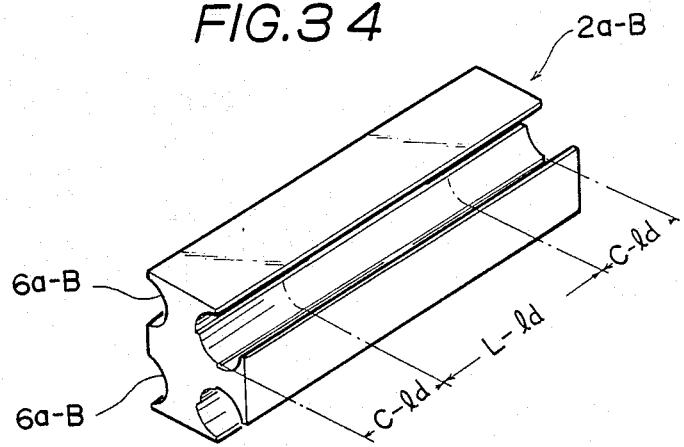
FIG. 34 is a perspective view of one of the bearing races shown in FIG. 33.

FIGS. 33 and 34 show in combination a modification of the bearing A5 for both linear and curvilinear motions according to the above-described fifth embodiment. Unlike the arrangement shown in FIG. 31, this modification is arranged such that the non-loaded ball bores 6a which are formed in the slide base 2a constituting the bearing body 2 are defined by grooves 6a-A formed in the slide base body 2a-A and the corresponding grooves 6a-B which are formed in the bearing races 2a-B. The bearing A4 of this modification is also capable of sliding on the linear and curvilinear areas L-ar and C-ar of the track surfaces 4 of the track rail 1 while bearing a load at the linear and curvilinear loaded domains L-1d and C-1d respectively, of the loaded ball rolling surfaces 5 formed on the bearing body 2 in the same way as in the above-described fifth embodiment.

Figure 35:
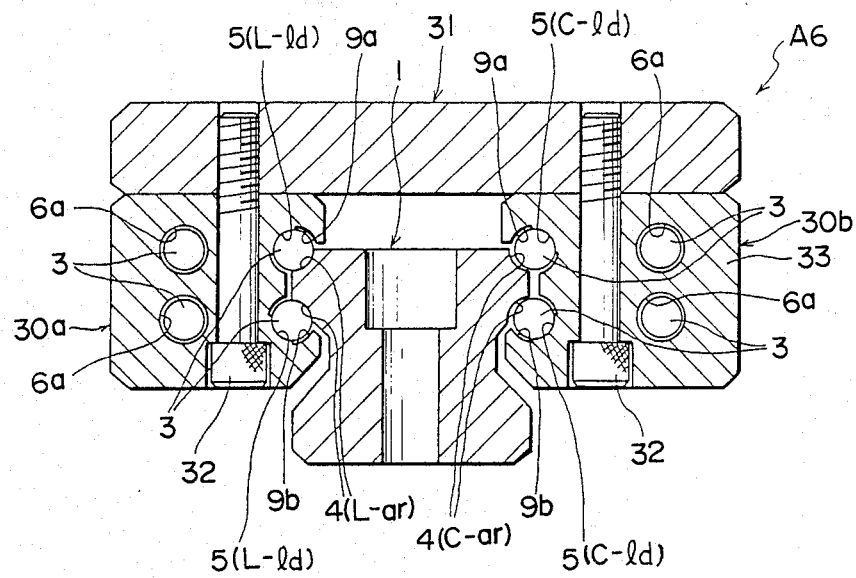
FIG. 35 is a sectional view similar to FIG. 5, which shows a bearing for both linear and curvilinear motions according to a sixth embodiment of the present invention.
Figure 36:
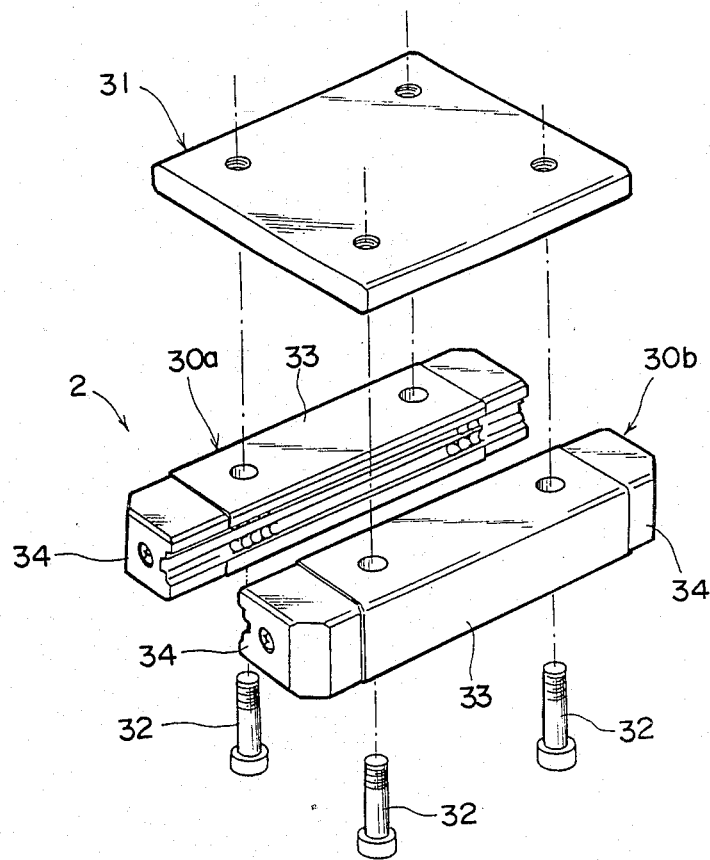
FIG. 36 is an exploded perspective view of the bearing body shown in FIG. 35.

FIGS. 35 and 36 show in combination a bearing A6 for both linear and curvilinear motions according to a sixth embodiment of the present invention. Unlike the above-described embodiments, this embodiment includes a bearing body 2 comprising a pair of slide base halves 30a and 30b serving as a pair of angular-contact bearing members and a top plate member 31 which is stretched between and secured to the respective upper surfaces of the pair of parallel slide base halves 30a and 30b by means of securing bolts 32 to connect them to each other. If linear and curvilinear domains for one slide base half, for example, 30a, are disposed in the following sequence, i.e., a linear loaded domain L-1d ↔ a curvilinear loaded domain C-1d ↔ loaded domain L-1d, linear and curviliner domains for the other slide base half 30b are disposed in the following sequence, i.e., a curvilinear loaded domain C-1d ↔ a linear loaded domain L-1d ↔ curvilinear loaded domain C-1d, so that, when the slide base halves 30a and 30b and the top plate member 31 are assembled together into the bearing body 2, a linear loaded domain L-1d (curvilinear loaded domain C-1d) which is formed on the loaded ball rolling surface 5 of one slide base half 30a faces a curvilinear loaded domain C-1d (linear loaded domain L-1d) which is formed on the loaded ball rolling surface 5 of the other slide base half 30b.

In the sixth embodiment, each of the slide base halves 30a and 30b comprises a slide member 33 having a pair of upper and lower loaded ball grooves 9 and a pair of upper and lower non-loaded ball bores 6a and a pair of cover members 34 which are secured to two axial ends, respectively, of the slide member 33, each cover member 34 having a pair of upper and lower ball turning passages 6b. Each loaded ball groove 9 is formed integral with the slide member 33 by means of cutting and grinding such that the inner diameter thereof is larger than the diameter d of the balls 3, while the opening width l is smaller than the ball diameter d, thereby enabling the balls 3 to roll freely along the loaded ball rolling surfaces 5 formed inside the loaded ball grooves 9 and, at the same time, preventing the balls 3 from falling from the loaded ball grooves 9 even when the bearing body 2, that is, the combination of slide base halves 30a and 30b, is separated from the track rail 1.

The bearing A6 of the sixth embodiment is also capable of sliding on the linear and curvilinear areas L-ar and C-ar of the track surfaces 4 of the track rail 1 while bearing a load at the linear and curvilinear loaded domains L-1d and C-1d, respectively, of the loaded ball rolling surfaces 5 formed on the bearing body 2 in the same way as in the above-described embodiments.

It should be noted that, in the case of the sixth embodiment also, the loaded ball grooves 9 which are formed in each of the slide base halves 30a and 30b constituting in combination the bearing body 2 may, of course, be defined by a groove portion formed in the surface of the slide base half 30a (30b) on the side thereof which is closer to the slide member 33 and a groove forming member which is secured to the slide member 33, as shown in FIGS. 18 to 20.

Figure 37:
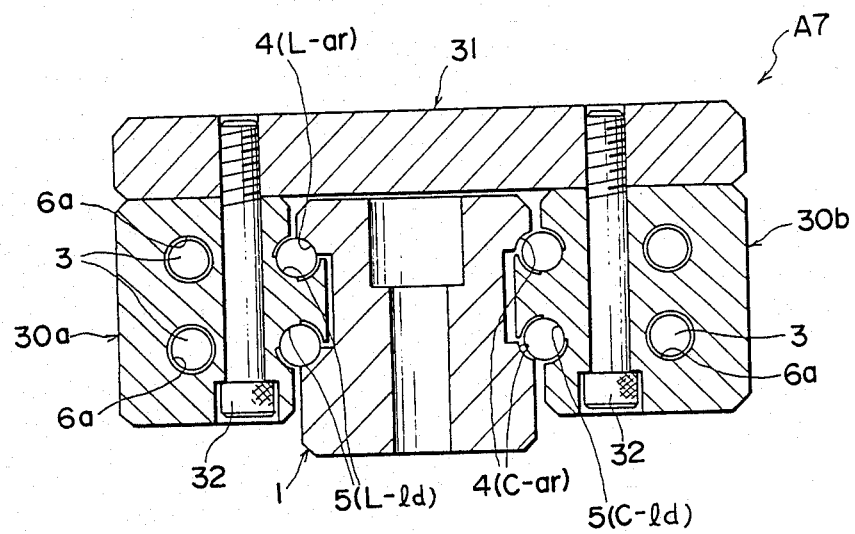
FIG. 37 is a sectional view similar to FIG. 5, which shows a bearing for both linear and curvilinear motions according to a seventh embodiment of the present invention.
Figure 38:
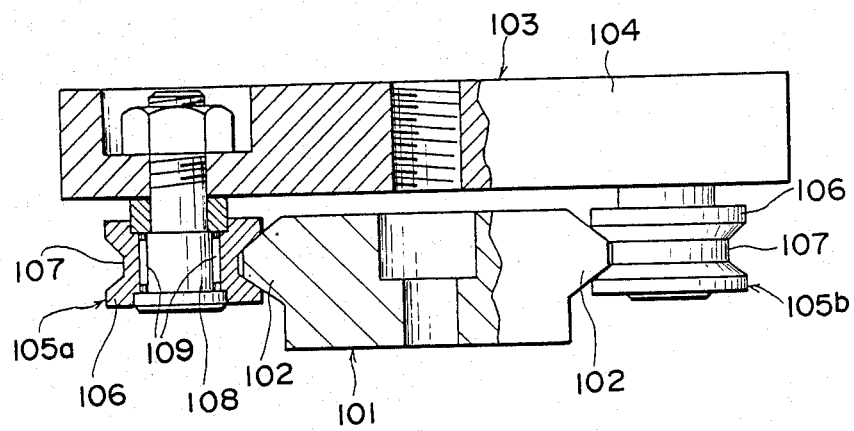
FIG. 38 is a partly-sectioned front view of a conventional curvilinear guide apparatus.

FIG. 37 shows a bearing A7 for both linear and curvilinear motions according to a seventh embodiment of the present invention. This embodiment is the same as the above-described sixth embodiment except that a pair of upper and lower loaded ball rolling surfaces 5 which are formed in each of the slide base halves 30a and 30b face in respective directions which diverge from each other, that is, the relationship between the loaded ball rolling surfaces 5 is reverse to that in the case of the sixth embodiment. In this embodiment also, the bearing A7 is capable of sliding both linearly and curvilinearly in the same way as in the above-described embodiments. In addition, the loaded ball grooves 9 in each of the slide base halves 30a and 30b may be defined by a groove portion formed in the surface of the slide base half 30a (30b) on the side thereof which is closer to the slide member 33 and a groove forming member which is secured to the slide member 33 in the same way as in the sixth embodiment.

What is claimed is:

1. A bearing for both linear and curvilinear motions comprising a track rail having a track surface formed longitudinally, a bearing body provided with an endless track having a loaded ball rolling surface facing said track surface and a non-loaded ball recirculating passage which continuously connects with both ends of said loaded ball rolling surface, and a multiplicity of balls which recirculate through the endless track provided in said bearing body to bear a load in the area defined between said loaded ball rolling surface and the track surface of said track rail, wherein said loaded ball rolling surface constituting the endless track in said bearing body is provided with a linear loaded domain and a curvilinear loaded domain having a predetermined curvature, so that, in a linear area of the track surface of said track rail, a load is born by balls rolling on said linear loaded domain, whereas, in a curvilinear area of the track surface of said track rail, a load is born by balls rolling on said curvilinear loaded domain.

2. A bearing for both linear and curvilinear motions according to claim 1, wherein said bearing body is defined by a slide base which has a horizontal portion and sleeve portions extending downward from the left and right sides, respectively, of said horizontal portion so as to have a substantially U-shaped cross-section with a recess defined in the lower side thereof, said slide base having one loaded ball rolling surface provided on the inner side of each of said sleeve portions.

3. A bearing for both linear and curvilinear motions according to claim 1, wherein said bearing body is defined by a slide base which has a horizontal portion and sleeve portions extending downward from the left and right sides, respectively, of said horizontal portion so as to have a substantially U-shaped cross-section with a recess defined in the lower side thereof, said slide base having a pair of adjacent loaded ball rolling surfaces provided on the inner side of each of said sleeve portions.

4. A bearing for both linear and curvilinear motions according to claim 1, wherein said bearing body is defined by a slide base which comprises slide base halves having a substantially rectangular cross-section, each slide base half having a pair of adjacent loaded ball rolling surfaces, and a top plate member stretched between and secured to the respective upper surfaces of said slide base halves.

5. A bearing for both linear and curvilinear motions according to any of claims 1 to 4, wherein said bearing body is provided with a loaded ball groove in which at least the opening width is smaller than the diameter of said balls, said loaded ball rolling surface being formed inside said loaded ball groove.

6. A bearing for both linear and curvilinear motions according to any of claims 1 to 4, wherein said loaded ball groove is formed integral with said bearing body by means of cutting and grinding.

7. A bearing for both linear and curvilinear motions according to any of claims 1 to 4, wherein said loaded ball groove is defined by a groove portion formed in said bearing body and a groove forming member secured to said bearing body.

8. A bearing for both linear and curvilinear motions according to claim 3 or 4, wherein said pair of adjacent loaded ball rolling surfaces face in respective directions which converge to each other.

9. A bearing for both linear and curvilinear motions according to claim 3 or 4, wherein said pair of adjacent loaded ball rolling surfaces face in respective directions which diverge from each other.

* * * * *